Jan. 19, 1954   R. G. AMES   2,666,323
MASTIC-APPLYING AND FINISHING TOOL
Filed Sept. 1, 1951   6 Sheets-Sheet 1

INVENTOR.
ROBERT G. AMES
BY
Munn, Liddy & Glaccum
ATTORNEYS

Jan. 19, 1954

R. G. AMES 2,666,323

MASTIC-APPLYING AND FINISHING TOOL

Filed Sept. 1, 1951

INVENTOR.
ROBERT G. AMES
BY
Munn, Liddy & Glaccum
ATTORNEYS

Patented Jan. 19, 1954

2,666,323

UNITED STATES PATENT OFFICE 2,666,323

MASTIC-APPLYING AND FINISHING TOOL

Robert G. Ames, Burlingame, Calif., assignor of one-half to George W. Williams and one-fourth to Stanley Ames, both of Burlingame, Calif.

Application September 1, 1951, Serial No. 244,786

11 Claims. (Cl. 72—130)

The present invention relates to mastic-applying and finishing tools. It has particular reference to improvements over the finishing tool disclosed in my copending application for Letters Patent, Serial No. 775,724, which was filed in the United States Patent Office on September 23, 1947, and allowed February 12, 1951 (now Patent No. 2,571,096).

In the above-identified case, I provide a hollow tool adapted to receive mastic under pressure. This mastic is discharged through an outlet opening against a wall board, or the like, as the tool is advanced thereover. The tool disclosed therein has a troweling bar at its trailing edge, which is designed to produce a desired curved surface on the troweled mastic.

An object of this invention is to provide yielding means adapted for applying pressure at a plurality of separated points along the length of the troweling bar to resist curving thereof, and to reduce the curvature of the crown, on the troweled mastic.

Moreover, the foregoing copending application makes use of a flexible wall forming part of the hollow body of the tool, this wall having an edge secured to the troweling bar by a plurality of clips. In the present case, this construction is simplified, affording easier assembly of the tool.

Further, the tool illustrated in the copending case provides a baffle plate secured to the hollow body so as to form a partial closure over the outlet for the mastic. In actual practice, it has been found that the mastic will crowd beneath this baffle, since the mastic is under pressure, resulting in forcing the tool away from the surface over which it is advanced.

Accordingly, in the present improved tool, a surface-contacting runner is provided ahead of the mastic-discharge opening This runner is fashioned with a resilient section disposed to bear against the surface upon which the tool is applied. This section is so designed as to preclude the mastic from flowing thereunder, with the result that the operator may hold the tool against the surface with the minimum of effort.

As a still further object of this invention, I provide a troweling bar having a plurality of notches fashioned therein. These notches are arranged to allow discharge of ribbons of the mastic upon the surface of a wall board or the like. The ribbons of mastic are used for anchoring a second wall board against the face of the first. Also, this modified troweling bar may be employed for placing ribbons of water-proof mastic on a floor prior to securing linoleum thereto.

Other objects and advantages will appear as the specification continues. The novel features will be pointed out in the claims hereunto appended.

DRAWINGS

For a better understanding of the invention, reference should be had to the accompanying drawings, forming part of this application, in which.

While I have shown only the preferred forms of my invention, it should be understood that various changes, or modifications, may be made within the scope of the annexed claims without departing from the spirit thereof.

DETAILED DESCRIPTION

*First embodiment*

Referring to the drawings in detail, the first embodiment of my mastic-applying and finishing tool is shown in Figures 1 to 14, inclusive.

Figure 9:
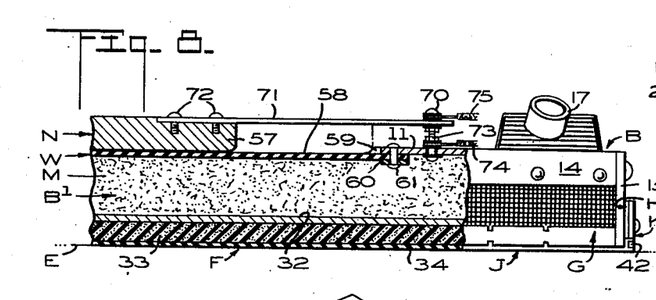
Figure 9 is a diagrammatic view of the tool showing a mastic-feeding mechanism for delivering mastic to the tool under pressure, and further disclosing a wiring diagram.

Turning initially to Figure 9, it will be noted that I make use of a mastic-feeding mechanism indicated generally at A. The latter is identical with that shown in the copending application previously mentioned. However, construction and operation thereof will be set forth, together with the wiring circuits employed in connection therewith, in order that the entire operation of my improved tool will be fully understood.

As shown, the mechanism A includes a platform 1, which may be supported by caster wheels 2, or other suitable means. This platform carries a hopper 3 in which mastic M is placed. Moreover, a gear pump 4, or the like, draws mastic from the hopper through a pipe 5, and this delivers the mastic under pressure into a flexible hose 6 extending from the mechanism.

In Figure 9, the pump is operated by a motor 7 through a pulley-belt connection 8. A battery is shown at 9 and a solenoid is indicated at 10. The latter two items will be explained in detail when the wiring diagram is described. Of course, the motor may be connected to any suitable source of current.

With particular reference to Figures 3-8, inclusive, it will be apparent that the mastic-applying and finishing tool includes a hollow body body B, which is adapted to receive the mastic M therein under pressure. This body defines a top wall 11 having front and rear partial walls 12 and 14, respectively, depending therefrom (see Figures 4, 5 and 7). Upright plates 15 are secured by screws 16 to opposite ends of the body B. These partial walls extend lengthwise of this body between the end plates 15, as clearly shown in Figures 4 and 5 of the drawings.

It will be observed that the interior of the body A defines a mastic-receiving compartment B1, which is filled completely with the mastic M during operation of the tool. For delivering mastic to this compartment, tubes 17 pierce the top wall 11 of the hollow body at positions spaced inwardly from the end plates 15. The mastic entering this compartment will have substantially a uniform density throughout the entire area of the compartment.

Figure 1:
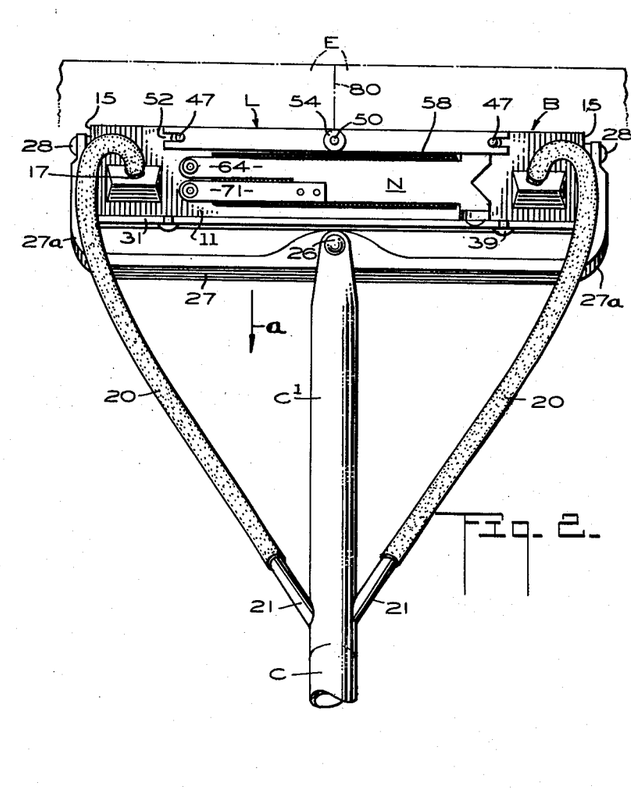
Figure 1 is an end elevational view of my improved tool, disclosing it being used for applying mastic to a wall, the handle of the tool being illustrated fragmentarily.
Figure 2:
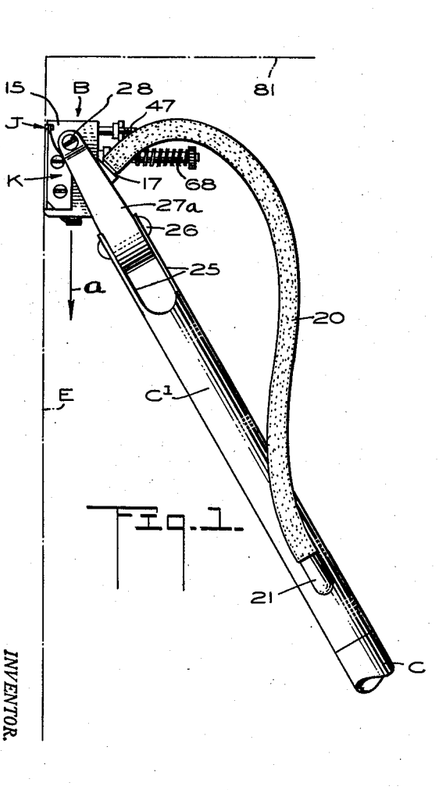
Figure 2 is a plan view of that portion of the tool shown in Figure 1.

For conveying the mastic to the compartment B1, flexible hoses 20 are connected to the tubes 17 (see Figures 1, 2 and 9). These hoses are coupled at their lower ends to branch tubes 21 that communicate with the interior of a tubular handle C. The lower end of this handle is provided with a valve D (see Figure 9), and the hose 6 leading from the mastic-feeding mechanism A is coupled to this valve. When a handle 22 is turned to open the valve D, mastic will be fed from the hose 6 into the tubular handle C for delivery through the hoses 20 and tubes 17 to the interior of the hollow body B.

Figure 9 shows the handle 22 as being provided with a terminal 23, and the latter is adapted to be brought into contact with a fixed terminal 24 when the valve D is opened. The closing of these two terminals will connect the motor 7 to the battery 9, or other source of current, in the manner hereinafter described.

The handle C has a solid portion C1 that is disposed between the branch tubes 21 and the body B. This handle portion is bifurcated to present arms 25, which are pivoted at 26 to a bail 27 (see Figures 1 and 2). The bail is provided with extensions 27a that are pivotally connected by screws 28 to the end plates 15 previously mentioned. The connection between the handle C and the body B is such that the handle may be swung in the direction of the length of the body by movement about the pivot 26. Also, the handle may be turned about the screws 28. The hoses 20 will permit such movements without interfering with the delivery of the mastic M to the interior of the body B.

Figure 7:
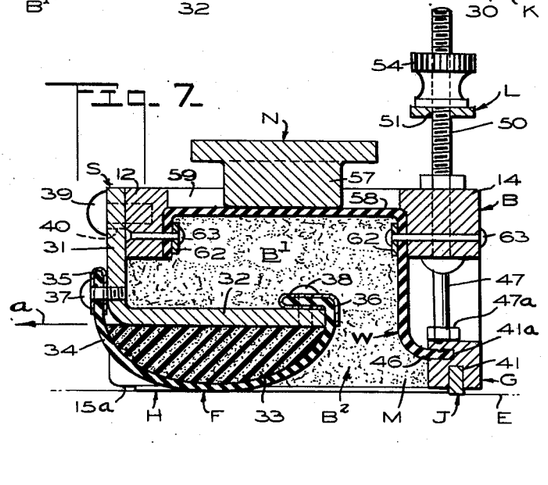
Figure 7 is a transverse vertical sectional view taken along the plane VII—VII of Figure 3.

In order to discharge the mastic to the surface of a wall board E, or the like, as the body B is advanced thereover, an elongated outlet opening B2 is provided at the bottom of the compartment B1 (see Figure 7). This opening is coextensive in length with the distance between the two end plates 15, and has a width extending from a leading resilient runner F to a trailing guide strip G. In actual practice, the body is advanced in the direction of the arrow a in Figures 1, 2 and 7. Thus, the runner F is disposed at the leading portion of the body, ahead of the opening B2, while the guide strip G is mounted at the trailing portion of the body, rearwardly of this opening.

It is desired to prevent the bottom edges 15a of the end plates 15 from wearing as the tool is advanced over the wall board. Therefore, I make use of a pair of wear shoes H (see Figures 5-7 and 10). These shoes are secured by screws 29 to the outermost faces of the end plates 15. Flanges 30 are provided on the bottom of the shoes and project inwardly under the edges 15a of the end plates so as to preclude these edges from contacting directly with the surface of the wall board, or the like. The shoes H may be made from hardened material so as to withstand considerable wear, and may be replaced from time to time.

Figure 5:
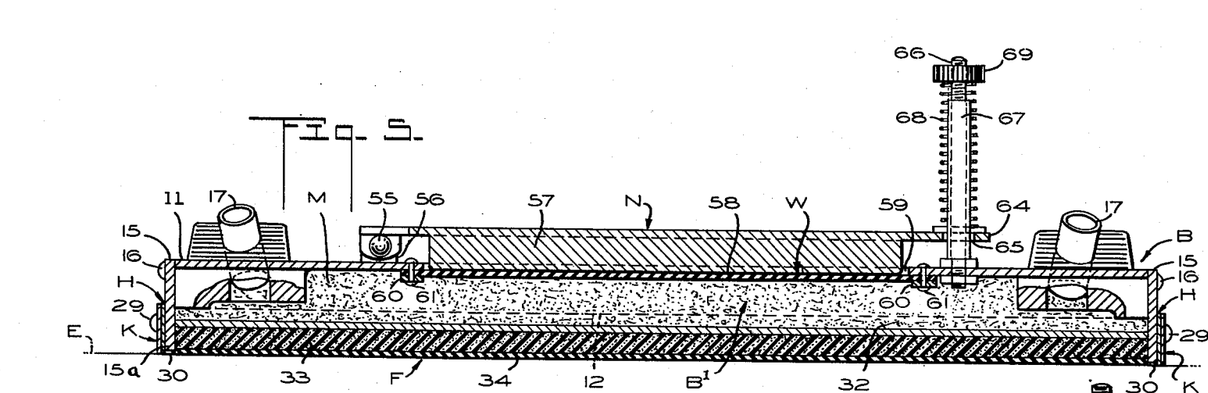
Figure 5 is a longitudinal vertical sectional view taken along the plane V—V of Figure 3.
Figures 11, 12, 13, 14:
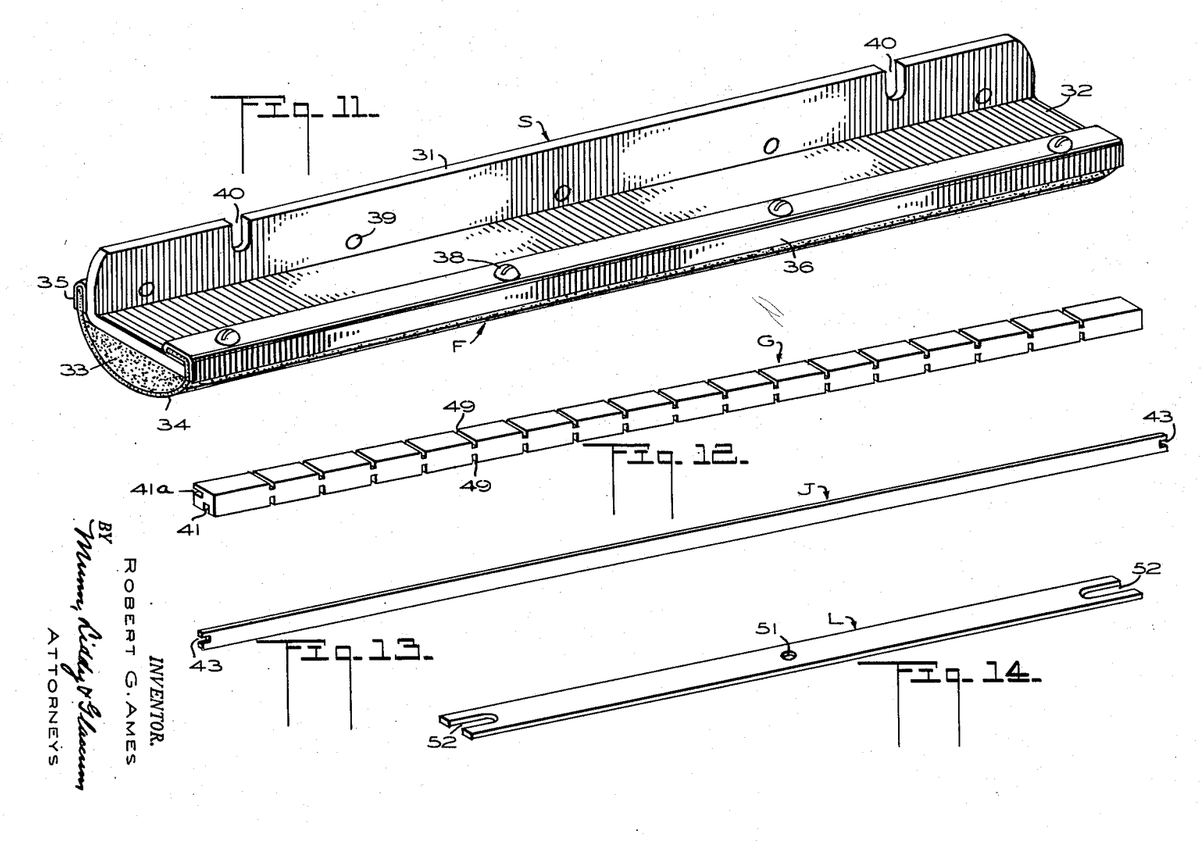
Figures 11, 12, 13 and 14 are isometric views of the resilient runner, yielding guide strip, troweling bar and pressure-adjusting lever, respectively.

Reference is made to Figures 5, 7 and 11 for the structural details of the resilient runner F. As shown in these views, the runner includes an L-shaped supporting member S defining vertical and horizontal flanges 31 and 32, respectively. Figure 7 discloses the flange 32 as being spaced from the surface of the wall board E, and having a piece of sponge rubber 33, or other resilient material, butted thereagainst to face toward the wall board.

A resilient covering 34, such as rubber, is applied over the sponge rubber backing 33. It will be noted that metallic fastening strips 35 and 36 are crimped over the marginal edges of the covering 34. Screws 37 and 38 are employed for securing these metallic strips to the flanges 31 and 32, respectively.

Particular attention is called to the fact that the resilient section of the runner F, which is provided by the sponge rubber 33 and its covering 34, is curved transversely on its underneath side (see Figure 7). This defines a surface-contacting rocker-like portion adapted to bear against the surface of the wall board E, or the like, when the tool is placed against the latter. Of course, this resilient rocker will yield so as to compensate for any irregular surface as the tool advances over the latter. It has sufficient resiliency to prevent the mastic M from forcing the body B away from the surface E.

The runner F extends the entire distance between the end plates 15. The vertical flange 31 of the runner is secured by screws 39 to the leading partial wall 12 of the body B. In order to allow the supporting member S of the runner to be adjusted toward and away from the surface of the board E, the screws 39 are inserted through slots 40 fashioned in the vertical flange 31 (see Figures 7 and 11).

As previously stated, the guide strip G is disposed at the trailing portion of the hollow body B. This strip has sufficient length to extend between the end plates 15, but it can move up and down relative thereto. A vertical channel 41 is fashioned lengthwise of the strip G from end to end on its underneath surface, and this channel is dimensioned to receive a troweling bar J of the shape shown in Figure 13 which normally is straight. The opposing ends of this bar project through notches 15b formed in the lower edges of the end plates 15 (see Figures 6 and 10).

Figure 6:
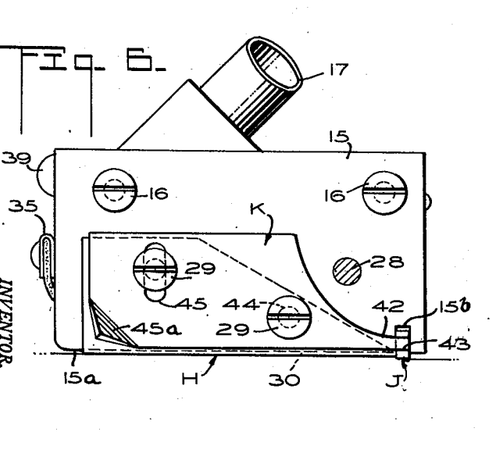
Figure 6 is an end view of the tool, as seen from the plane VI—VI of Figure 3.
Figure 10:
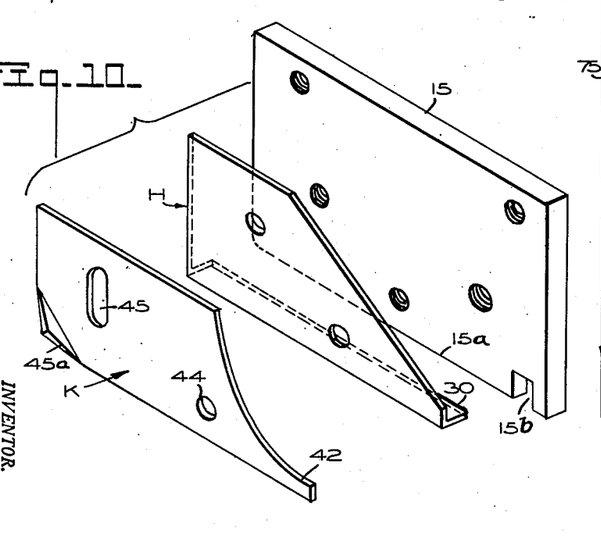
Figure 10 is a bracketed isometric view illustrating an end plate, wear shoe and bar-retaining plate utilized at each end of the tool and disclosing these three parts in separated relation with respect to one another.

For the purpose of adjustably anchoring the troweling bar J to the end plates, the latter are provided with bar-retaining plates K of the shape shown in Figures 6 and 10. The plates K are butted flatwise against the outermost surfaces of the wear shoes H, and have fingers 42 thereon adapted for fitting into bifurcated ends 43 of the troweling bar (see Figures 6, 10 and 13).

In Figure 6, I show one of the screws 29 as passing through an opening 44 provided in the retaining plate K. The other screw 29 extends through a slot 45 formed in the same plate. These screws may be loosened so that the plate K can be tilted for the purpose of projecting the troweling bar J to a greater or less extent relative to the guide strip G. Thus the troweling bar may be adjusted to compensate for wear. Upon tightening the screws 29—29, the ends of the troweling bar are held in position relative to the end plates 15—15. An out-turned corner 45a on the plate K facilitates adjustment thereof.

Figures 3, 4:
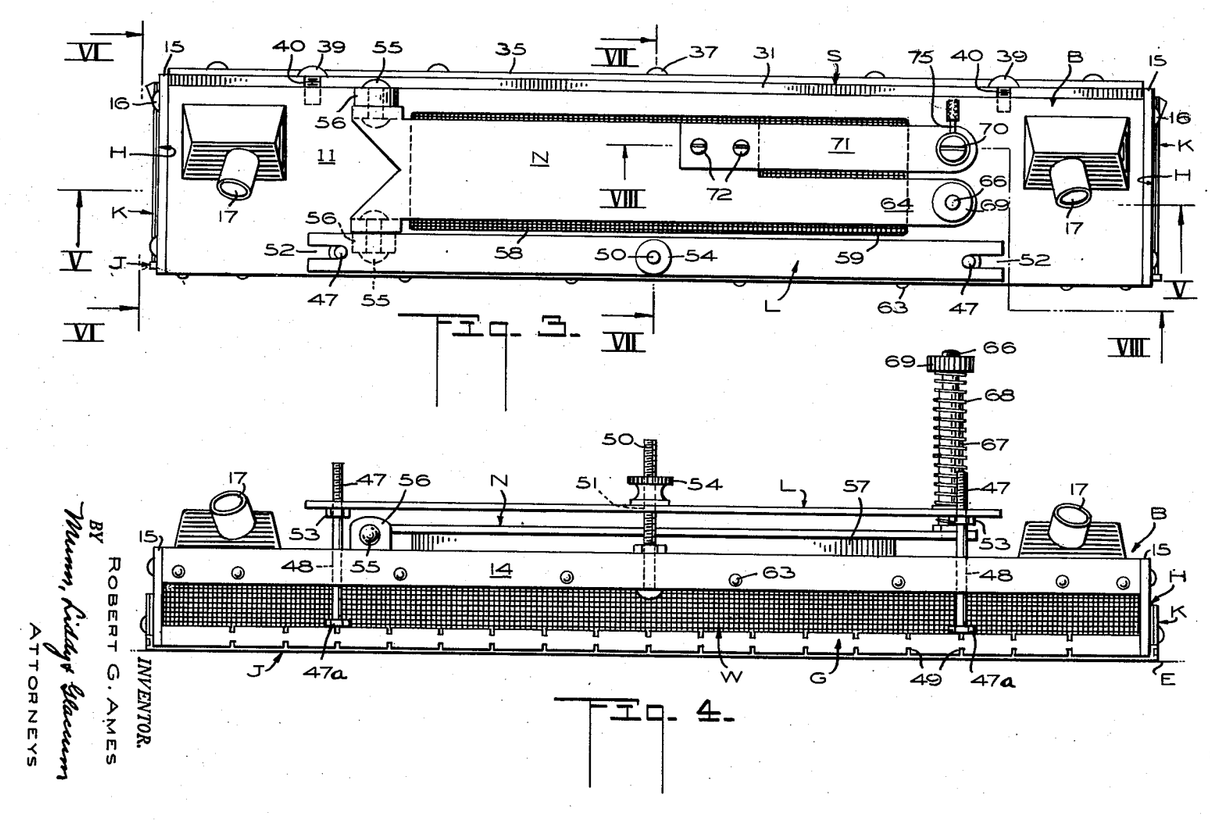
Figure 3 is a top plan view of the mastic-applying tool by itself, shown on a larger scale than Figure 2.
Figure 4 is an elevational view of the tool as seen from the trailing edge thereof.

As clearly shown in Figures 3 and 5, wear shoes H and bar-retaining plates K are provided on both end plates 15. Of course, the flanges 30 of the two shoes extend toward one another. The troweling bar is rectangular in cross-section. It is quite obvious that when one edge of this bar becomes worn, the bar may be turned so that another edge is disposed at the trailing edge of the tool. In this manner, all four corners may be utilized before a new troweling bar is required.

In Figures 5 and 7, I show a flexible wall designated generally at W, which may be made of rubber, or the like. This wall forms part of the hollow body in which the mastic M is accommodated, and it has a marginal section or edge 46 clamped in a horizontal channel 41a that extends lengthwise of the guide strip G. The latter may be crimped or otherwise secured to the edge 46, as shown in Figure 7.

The troweling bar J is semi-flexible and may be flexed under pressure so as to produce a crown on the troweled mastic. During this flexing, fingers 42 remain engaged with the bifurcated ends 43 of the bar. However, in order to reduce the amount of curvature on this crown, pressure-adjusting pins 47 are arranged to apply downward force to the yielding guide strip G at a plurality of separate points along the length of the troweling bar, thus resisting upward curving of the latter which is caused by the mastic M under pressure in the compartment B1 crowding under the bar J. It is quite obvious that omission of the pressure-applying pins 47 would allow the bar J to flex upwardly more readily. These pins are slidably disposed in bores 48 formed in the trailing partial wall 14 (see Figure 4).

As clearly illustrated in Figure 12, the guide strip G is fashioned with a series of horizontal slots 49 spaced from one another along the length of the strip so that the latter will flex under pressure. Heads 47a on the lower ends of the pins 47 bear against the top surface of the guide strip G in the manner shown in Figures 4 and 7.

For varying the amount of downward pressure exerted upon the pins 47, and thereby control the flexing of the guide strip G and its troweling bar J, a yielding lever L is provided. This lever is spaced above the body B and is mounted to extend lengthwise of the strip and bar. A centrally-disposed post 50 is fastened to the body B so as to rise therefrom, with this post projecting through an opening 51 fashioned in the lever (see Figures 4 and 14). The opposing ends of the lever L are bifurcated, as at 52, so as to straddle the pins 47 (see Figure 3). The latter are provided with nuts 53 thereon against which the lever is adapted to bear. An adjusting nut 54 is threaded onto the post 50 above the lever L. As shown in Figure 4, the spaced-apart nuts 53 bear against the underneath surface of the lever L, while the intermediate nut 54 abuts the top surface thereof, thus preventing the lever L from tilting.

From the construction just described, it will be apparent that the nut 54 may be adjusted so as to vary the amount of pressure on the pins 47. In turn, this will control the flexing of the troweling bar J and its guide G as the tool is advanced over the mastic disposed on the face of the wall board, or the like.

The electric circuit shown in Figure 9 for the motor 7 is opened when the compartment B1 of the tool is filled with mastic M. For this purpose I provide a lever N (see Figures 2–5 and 7) that is pivoted at 55 to ears 56, the latter being fixed to the top wall 11 of the body B. This lever has a plate-like projection 57 on its underneath surface that bears against an upper portion 58 of the flexible wall W. This wall portion covers an opening 59 provided in the top wall 11. The projection 57 extends downwardly through the opening 59 so as to contact with the flexible wall.

Figure 5 shows this flexible wall portion 58 as being secured to the underneath surface of the top wall 11 by transverse strips 60 and rivets 61, or other suitable fastening means. In Figure 7, I disclose additional strips 62 and rivets 63 for securing the longitudinal parts of the flexible wall portion 58 to the leading and trailing partial walls 12 and 14, respectively.

When the mastic M completely fills the compartment B1, the flexible wall portion 58 will bulge upwardly, and this will swing the lever N about its pivots 55. The free end 64 of this lever has an opening 65 therein through which a stud 66 extends, this stud being fixed to the body B (see Figure 5). A sleeve 67 surrounds this stud. It will be noted that a coil spring 68 is mounted around this sleeve and bears against the free end 64 of the lever N for urging the latter toward the upper portion 58 of the flexible wall W. The tension on the spring is controlled by adjustment of a knurled nut 69 that is threaded onto the upper end of the stud.

Figure 8:
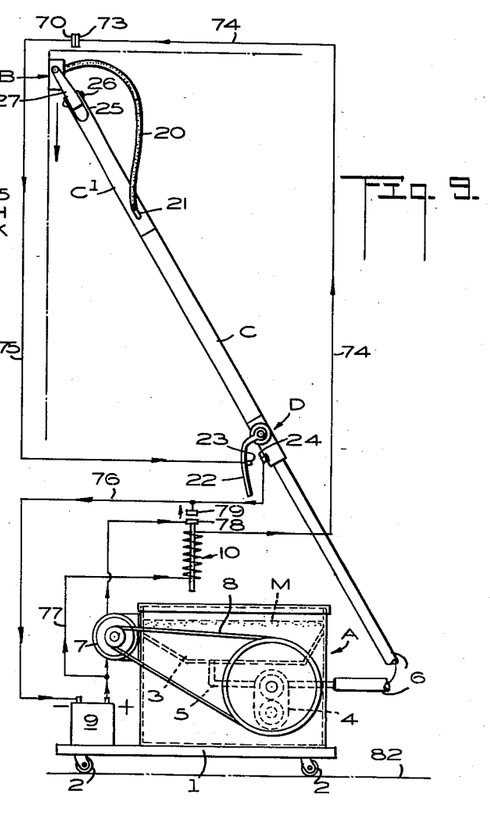
Figure 8 is a fragmentary longitudinal sectional view taken along the plane VIII—VIII of Figure 3, with parts being disclosed in elevation.

Referring to the details of the wiring circuits, as shown in Figures 3, 8 and 9, an electrical terminal 70 is carried by a leaf-spring arm 71 and is insulated therefrom. This spring arm is fixed to the lever N by screws 72, or the like. The arrangement is such that the flexible wall portion 58 will bulge to a predetermined extent and raise the lever N, but the leaf spring arm will cause the terminal 70 to remain in contact with a terminal 73, the latter being fixed to and insulated from the top wall 11 of the body B (see Figure 8).

When the lever N moves upwardly a certain distance, the contacts 70 and 73 will be separated, thus breaking the motor circuit. A wire 74 leads from the fixed terminal 73, and a second wire 75 leads from the movable terminal 70 (see Figures 8 and 9). As illustrated in Figure 9, the wire 75 connects with the terminal 23 on the valve handle 22. Also, a wire 76 extends from the valve terminal 24 to one side of the battery 9, or other source of current. Moreover, the wire 74 is connected to one end of the coil of the solenoid 10. The other end of this solenoid coil is connected by a wire 77 to the remaining side of the source of current.

Accordingly, when the lever 22 is moved by the operator to open the valve D, the terminals 23—24 will be closed, and inasmuch as the compartment B1 has no mastic therein at the start of the operation, the terminals 70—73 initially remain closed. This will cause a flow of current from the battery 9 through the coil of the solenoid 10. The energizing of the coil will move a contact 78 on the solenoid armature into contact with a stationary contact 79, and this will connect the motor 7 with the source of current, as suggested by the arrows in Figure 9.

Now the motor will actuate the pump 4 and force mastic under pressure into the tool body compartment B1. As soon as the mastic reaches a point where the flexible wall portion 58 will be moved upwardly a predetermined distance, the terminals 70—73 will be separated. This will cut off the flow of current to the solenoid 10, with the result that the contacts 78—79 will be opened and current will cease flowing to the motor. Therefore, the pump will stop, and no further mastic will be delivered to the compartment B1 at this time.

While the tool is being used, the quantity of mastic M in the compartment B1 will be reduced, and the spring 68 will force the lever N and its projection 57 against the flexible wall portion 58, causing the terminals 70—73 to contact again. This will result in the immediate operation of the motor 7 and the pumping of additional mastic to the body B. Therefore, it will be seen that the supply of mastic to the body of the tool is controlled automatically, and there will be no slopping over of the mastic on the wall boards E, or the like, due to an excess of mastic feed.

SUMMARY OF OPERATION

First embodiment

In Figures 1 and 2, I show the tool as being applied over a vertical joint 80 defined between abutting wall board sections E. The tool is drawn downwardly from the ceiling 81 in the direction of the arrows a. For applying mastic to the lower portion of the vertical joint 80, near the floor 82 (see Figure 9), the tool can be turned upside down, and then moved upwardly over the joint. The handle C is long enough to permit ceiling joints to be covered with mastic.

As the body B is moved over the wall boards in the direction of the arrow a, mastic M will be delivered through the outlet opening B2 to the surface of these boards. During the advancement of the body, as suggested by the arrow a in Figure 7, the troweling bar J at the trailing end of the tool body will remove excess mastic from the wall board surface.

Inasmuch as the ends of the troweling bar are anchored to the end plates 15—15 of the tool, while the remainder of the bar is supported by the guide strip, there will be a tendency for the troweling bar to arch upwardly as it is drawn over the mastic. In this connection, it will be noted that the guide strip G is not secured to the end plates 15—15, but floats relative thereto. Accordingly, a crown is produced on the troweled mastic, with the lateral edges of the mastic feathering toward the wall board.

The curvature of this crown is controlled by adjusting the nut 54 on the post 50 so as to regulate the downward pressure of the pins 47 on the guide strip. Since the pins 47 are disposed at spaced-apart points along the length of the guide G and the bar J, a very gentle slope may be imparted to the crown of the troweled mastic, and the curvature of this crown may be changed to meet the requirements.

The resilient runner F, which is disposed ahead of the outlet opening B2, rides over the surface of the wall board E. Its sponge rubber backing 33 will yield to compensate for any uneven wall board surface. Moreover, it will yield to prevent the pressure of the mastic from forcing the body B away from the wall board.

The wear shoes H have their flanges 30 disposed to ride directly upon the surfaces of the wall boards, and they may be replaced from time to time. As the troweling bar J wears, it may be turned so as to present a new edge at the trailing side of the tool. Also, the bar-retaining plates K may be adjusted to project the troweling bar at the desired distance below the guide strip G.

Second embodiment

Figures 15, 16, 17, 18:
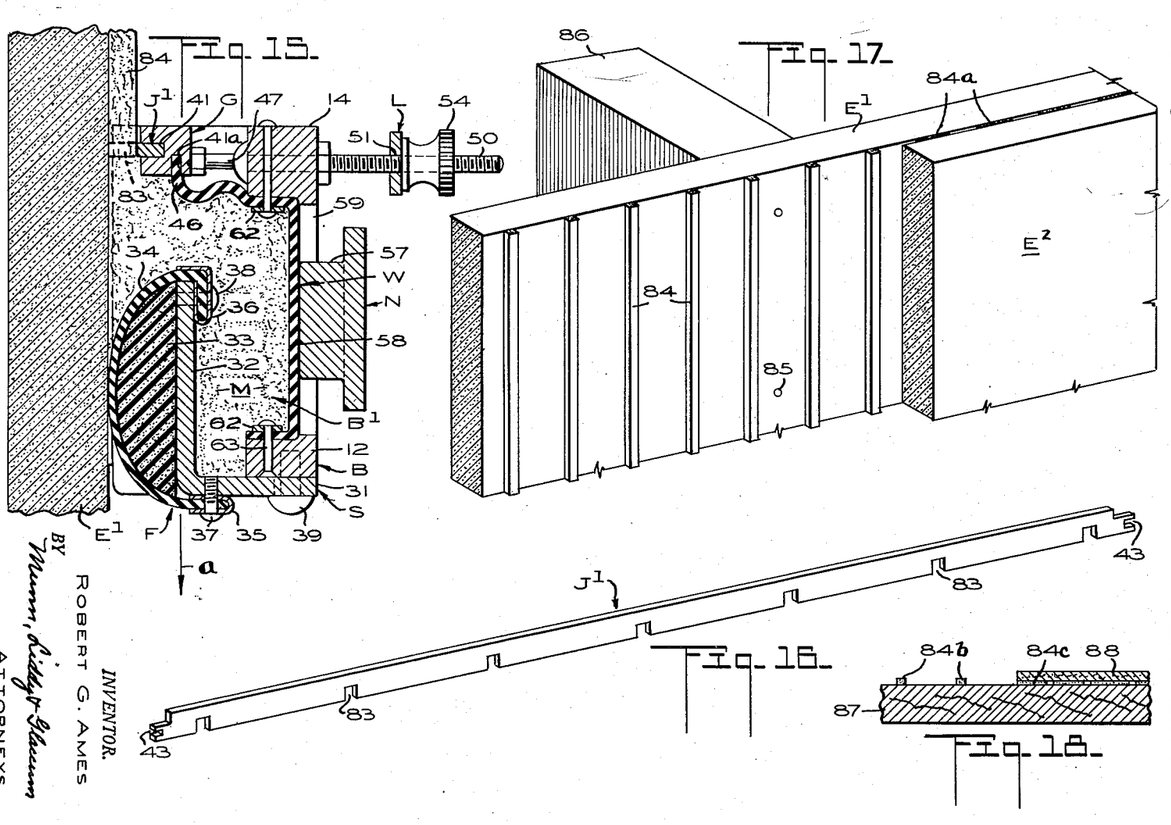
Figure 15 is a transverse sectional view taken through the mastic-applying and finishing tool, similar to Figure 7, but illustrating a modified form of a troweling bar, the latter being made to discharge ribbons of the mastic upon a surface.
Figure 16 is an isometric view of this modified troweling bar.
Figure 17 is a fragmentary isometric view of a portion of a wall, disclosing ribbons of mastic applied by the modified tool to the inner panel of the wall, and further showing an outer panel anchored to a portion of the inner panel by the mastic ribbons.
Figure 18 is a horizontal sectional view showing linoleum bonded to a floor, my modified tool being used for the purpose.

The mastic-applying and finishing tool shown in Figures 15 and 16 is identical in all respects with the first form of the tool, with the exception of a modified troweling bar J1. Accordingly, like reference numerals have been applied to corresponding parts.

This modified troweling bar is rigid and somewhat wider than the bar J. It is fashioned with a plurality of notches 83 in its underneath surface. As the tool is advanced over an inner wall board panel E1, for example, parallel rows of mastic ribbons 84 are discharged upon the surface of the wall board. After the bar J1 has been applied to the guide G, both may be pushed upwardly so as to permit the underneath edge of this bar to be placed flush with the flanges 30 of the shoes H. At this time, the fingers 42 on the plates K are engaged with the notches 43 in the ends of the bar J1. The flexible wall W will yield to allow this upward movement of the wider troweling bar.

In practice, the inner panel E1 is nailed, as at 85, to studs 86, as shown in Figure 17. After the ribbons 84 of mastic have been applied, an outer panel E2 is butted flatwise against the first. This will cause spreading of the mastic ribbons, as suggested at 84a, bonding the two panels together.

Figure 18 discloses a further use of this modified tool, wherein parallel ribbons 84b of suitable mastic have been applied to a floor 87. Linoleum 88 may be anchored to this floor by the interposed flattened-out ribbons 84c of mastic. It is quite obvious that the same arrangement may be utilized for securing acoustic boards in place.

I claim:

1. In a mastic-applying and finishing tool: a hollow body adapted for receiving mastic under pressure, and being movable over a surface; this body having an outlet opening in the bottom thereof to deliver the mastic to the surface as the body is advanced thereover; the body being provided with end plates; an elongated troweling bar mounted adjacent the trailing edge of the body, and disposed to trowel the mastic delivered to the surface; means anchoring the ends of the troweling bar to the end plates of the body; the bar being flexible for arching upwardly as the mastic crowds thereunder to form a crown on the troweled mastic; and yielding means confined within the length of the body for applying downward pressure at a plurality of separated points along the length of the bar to resist upward arching of the bar, and to reduce the amount of curvature on the crown of the troweled mastic.

2. The combination as defined in claim 1, in which the means for anchoring the ends of the troweling bar to the end plates of the body is adjustable so that the bar may be projected downwardly relative to the end plates and thus toward the surface over which the body is moved.

3. In a mastic-applying and finishing tool: a hollow body adapted for receiving mastic under pressure, and being movable over a surface; this body having an outlet opening in the bottom thereof to deliver the mastic to the surface as the body is advanced thereover; the body being provided with end plates; a flexible guide strip extending between the end plates and disposed lengthwise of the body near the trailing edge thereof; the guide strip floating between the end plates for up and down movement; an elongated troweling bar carried by the guide strip, and disposed to trowel the mastic delivered to the surface; means anchoring the ends of the troweling bar to the end plates of the body; the bar being flexible for upward arching thereof to form a crown on the troweled mastic; a yielding lever spaced above the body and extending lengthwise of the guide strip and troweling bar; a plurality of spaced-apart pressure-adjusting pins interposed between this lever and the guide strip; these pins applying downward pressure at separated points along the guide strip to resist upward arching of the troweling bar as the mastic crowds under this bar, and to reduce the curvature of the crown on the troweled mastic; and means for adjusting the lever toward and away from the guide strip to vary the downward pressure exerted by the pins on this strip.

4. In a mastic-applying and finishing tool: a hollow body adapted for receiving mastic under pressure, and being movable over a surface; this body having an outlet opening in the bottom thereof to deliver the mastic to the surface as the body is advanced thereover; the body being provided with end plates; a flexible guide strip extending between the end plates and disposed lengthwise of the body near the trailing edge thereof; the guide strip floating between the end plates for up and down movements; an elongated troweling bar carried by the guide strip, and disposed to trowel the mastic delivered to the surface; means anchoring the ends of the troweling bar to the end plates of the body; the bar being flexible for upward arching thereof to form a crown on the troweled mastic; a yielding lever spaced above the body and extending lengthwise of the guide strip and troweling bar; a plurality of spaced-apart pressure-adjusting pins interposed between this lever and the guide strip; these pins applying downward pressure at separated points along the guide strip to resist upward arching of the troweling bar as the mastic crowds under this bar, and to reduce the curvature of the crown on the troweled mastic; means for adjusting the lever toward and away from the guide strip to vary the downward pressure exerted by the pins on this strip; a flexible wall forming part of the hollow body, and having an edge disposed near the guide strip; and means for securing this edge of the wall to the guide strip so as to move therewith.

5. In a mastic-applying and finishing tool: a hollow body adapted for receiving mastic under pressure, and being movable over a surface; this body having an outlet opening in the bottom thereof to deliver the mastic to the surface as the body is advanced thereover; the body being provided with end plates; a unitary guide strip extending between the end plates and disposed lengthwise of the body near the trailing edge thereof; this strip floating between the end plates for up and down movement and being fashioned with a longitudinal groove; an elongated troweling bar fitting into the groove of the guide strip, and disposed to trowel the mastic delivered to the surface; means for anchoring the ends of the troweling bar to the end plates of the body; the troweling bar having notches formed therein through which ribbons of the mastic will be discharged upon said surface as the tool is advanced; and yielding means for applying downward pressure to the guide strip to resist upward movement thereof.

6. In a mastic-applying and finishing tool: a hollow body adapted for receiving mastic under pressure, and being movable over a surface; this body having an outlet opening in the bottom thereof to deliver the mastic to the surface as the body is advanced thereover; the body being provided with end plates; a unitary guide strip extending between the end plates and disposed lengthwise of the body near the trailing edge thereof; this strip floating between the end plates for up and down movement and being fashioned with a longitudinal groove; an elongated troweling bar fitting into the groove of the guide strip, and disposed to trowel the mastic delivered to the surface; means for anchoring the ends of the troweling bar to the end plates of the body; this anchoring means for the bar being adjustable so as to project the troweling bar downwardly relative to the end plates and thus toward the surface over which the body is moved; and yielding means for applying downward pressure to the guide strip to resist upward movement thereof.

7. In a mastic-applying and finishing tool: a hollow body adapted for receiving mastic under pressure, and being movable over a surface; this body having an outlet opening in the bottom thereof to deliver the mastic to the surface as the body is advanced thereover; the body being provided with end plates; a unitary guide strip movable relative to and extending between the end plates and disposed lengthwise of the body near the trailing edge thereof; this strip floating between the end plates for up and down movement and being fashioned with a longitudinal groove; an elongated troweling bar fitting into the groove of the guide strip, and disposed to trowel the mastic delivered to the surface; means for anchoring the ends of the troweling bar to the end plates of the body; the guide strip being fashioned with a series of slots spaced from one another along the length of the strip so that the latter will flex under pressure; and yielding means for applying downward pressure to the guide strip to resist upward movement thereof.

8. In a mastic-applying and finishing tool: a hollow body adapted to receive mastic under pressure, and being movable over a surface; this body having an outlet opening in the bottom thereof to deliver the mastic to the surface as the body is advanced thereover; a troweling bar carried by the body, and disposed to trowel the mastic delivered to the surface; and a surface-contacting runner mounted on the body ahead of the opening; this runner having a resilient section disposed to bear against the surface upon which the tool is applied; the troweling bar being provided with notches through which ribbons of the mastic will be discharged upon said surface as the tool is advanced.

9. In a mastic-applying and finishing tool: a hollow body adapted to receive mastic under pressure, and being movable over a surface; this body having an outlet opening in the bottom thereof to deliver the mastic to the surface as the body is advanced thereover; a troweling bar carried by the body, and disposed to trowel the mastic delivered to the surface; a surface-contacting runner mounted on the body ahead of the opening; this runner having a resilient section disposed to bear against the surface upon which the tool is applied; and adjustable means supporting the runner on the body for adjustment of the runner toward and away from said surface.

10. In a mastic-applying and finishing tool: a hollow body adapted to receive mastic under pressure, and being movable over a surface; this body having an outlet opening in the bottom thereof to deliver the mastic to the surface as the body is advanced thereover; a troweling bar carried by the body rearwardly of the opening, and disposed to trowel the mastic delivered to the surface; a surface-contacting runner mounted on the body ahead of the opening; this runner including a resilient section curved transversely and defining a rocker-like portion adapted to bear against the surface when the tool is placed against the latter; the runner including an L-shaped supporting member; the latter defining vertical and horizontal flanges; the resilient runner being secured to the horizontal flange; and adjustable means fastening the vertical flange to the body for adjustment of the supporting member toward and away from said surface.

11. In a mastic-applying and finishing tool: a hollow body adapted for receiving mastic under pressure, and being movable over a surface; this body having an outlet opening in the bottom thereof to deliver the mastic to the surface as the body is advanced thereover; a pair of spaced-apart end plates carried by the body and having edges adapted to be positioned adjacent to the surface upon which the mastic is applied; these edges having notches therein aligned with one another; a troweling bar slidably mounted in these notches, and being adjustable relative to the end plates so as to project therefrom; the ends of this bar being bifurcated adjacent to the end plates; a pair of bar-retaining plates swingably adjustable relative to the end plates and having fingers engaging with the bifurcated ends of the troweling bar.

ROBERT G. AMES.

References Cited in the file of this patent

UNITED STATES PATENTS

| Number | Name | Date |
| --- | --- | --- |
| 1,250,809 | Davis | Dec. 18, 1917 |
| 2,395,186 | Jones | Feb. 19, 1946 |
| 2,571,096 | Ames | Oct. 16, 1951 |

FOREIGN PATENTS

| Number | Country | Date |
| --- | --- | --- |
| 21,696 | Netherlands | Mar. 16, 1930 |